Figure 1:
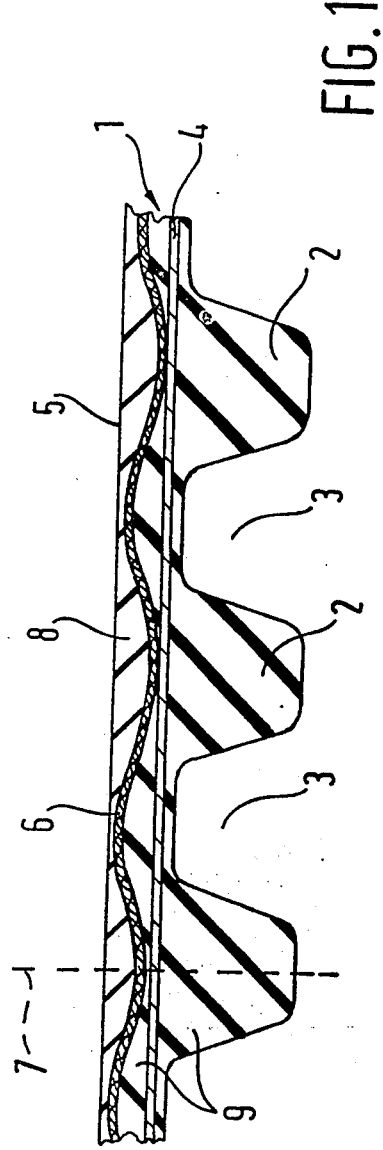

United States Patent [19]

Cicognani

[11] 4,445,879
[45] May 1, 1984

[54] TOOTHED BELT

[75] Inventor: Mario Cicognani, Milan, Italy

[73] Assignee: Industrie Pirelli, S.p.A., Milano, Italy

[21] Appl. No.: 257,586

[22] Filed: Apr. 27, 1981

[30] Foreign Application Priority Data

Jun. 5, 1980 [IT] Italy .............................. 22557 A/80

[51] Int. Cl.³ .......................... F16G 1/00; F16G 5/00; F16G 1/26
[52] U.S. Cl. .................................. 474/205; 474/250; 474/264
[58] Field of Search ............... 474/202, 204, 205, 246, 474/250, 260, 261, 264, 266, 267, 268, 271

[56] References Cited

U.S. PATENT DOCUMENTS

| | | | |
|---|---|---|---|
| 2,695,530 | 11/1954 | Calzolari | 474/100 |
| 3,260,126 | 7/1966 | Waugh | 474/265 |
| 3,523,462 | 8/1970 | Beindorf | 474/167 |
| 3,535,946 | 10/1970 | Miller | 474/205 |
| 3,580,767 | 5/1971 | Barnes et al. | 156/138 |
| 3,621,727 | 11/1971 | Cicognani | 474/205 |
| 3,937,094 | 2/1976 | Cicognani | 474/205 |
| 4,099,422 | 7/1978 | Cicognani et al. | 474/205 |
| 4,137,787 | 2/1979 | Waugh | 474/263 |
| 4,276,039 | 6/1981 | Takano | 474/205 |

Primary Examiner—Lawrence J. Staab
Assistant Examiner—Michael David Bednarek
Attorney, Agent, or Firm—Stevens, Davis, Miller & Mosher

[57] ABSTRACT

The present invention relates to a toothed belt provided with an undulated fabric embedded in the part of the belt's body between its tension resistant insert member and its back. The elastomeric material of the toothed belt disposed between the undulated fabric and the back has a lesser hardness than that forming the remaining part of the belt.

11 Claims, 2 Drawing Figures

TOOTHED BELT

The present invention relates to a toothed belt of elastomeric material, and more particularly, to a belt having an annular body provided with an embedded tension resistant insert member which is formed by a plurality of flexible and inextensible cords parallel and coplanar to one another. The belt is provided on one face of the annular body with a toothing adapted to engage with the toothing of toothed pulleys in order to transmit motion from one to the other.

One problem encountered with toothed belts made of elastomeric material is that of extending the lifetime of the belt to that approximately equal to the lifetime of motion transmission devices which are provided with metallic gears.

In order to solve this problem, up to now, attention has been given to the toothing of the belt since elastomeric teeth deform more easily than the toothing of the metallic mechanical devices with consequent alteration in the kinematics of the meshing during the transmission of motion between the toothed belt and toothed metallic pulleys.

Three ways have been proposed for solving this problem. Firstly, it has been proposed to make the teeth of elastomeric material having a high hardness to reduce as much as possible the deformability of the teeth.

Secondly, particular profiles of the toothing of a toothed belt have been designed to reduce the deformability of the teeth of the belt during their meshing with the metallic teeth of the pulleys.

Thirdly, particular coverings of the toothing of the toothed belts have been studied in order to increase, on the one hand, the rigidity of the teeth of the toothed belt and, on the other hand, to reduce the wear of the teeth by meshing action which always involves sliding between the teeth of the belt and the teeth of the pulleys.

Following the above indicated ways, it has been possible to extend the lifetime of the toothed belts, but it has not been possible to equal the lifetime of the metallic mechanical gears. Moreover, it has been necessary to use large overall dimensions of the belt teeth and toothed pulleys. In fact, each element has resulted in stiffening of the toothed belt with accompanying (a) exaltation of the vibration phenomena in the belt during the transmission of motion between toothed belt and toothed pulleys which prevent the toothed belt from having a long lifetime; and (b) impossibility of using elastomeric material of very high hardness for the manufacturing of toothed belts, in order not to compromise in an excessive way the flexibility of the toothed belt.

Another problem that the known toothed belts have is that they are not adequately protected from the harmful action that foreign bodies or foreign substances in general can exert upon contact therewith during working of the belt in motion transmission with toothed pulleys.

The consequence is that cuts or fissures form in the belts especially in the back of the belt, and the width of the cuts and of the fissures expands rapidly and subject the tension resistant insert member to the action of foreign substances or bodies with consequent breaking of the resistant insert member with loss of service of the toothed belt.

An object of the present invention is to extend the lifetime of toothed belts by preventing vibrations from arising in the belt during the transmission of motion also using for the toothing of said belts all the known elements so that the teeth of said belts are rigid, making possible contemporaneously a reduction in the overall dimensions for the toothed belt, toothed pulleys transmission assembly and simultaneously providing improved protection of the tension resistant insert member. Another object of the invention is to provide an improved endless toothed belt having a tension resistant insert member disposed longitudinally through the belt body. Still another object of the invention is to improve the behavior of a toothed belt during engagement of its teeth with teeth of a pulley and to reduce the likelihood of the belt's elastomeric body becoming separated from its tension resistant insert member.

Figure 2:
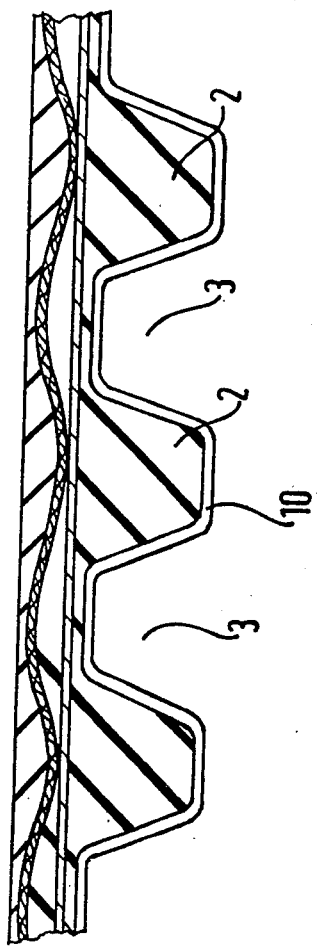

Other objects will become apparent from the following description with reference to the accompanying drawing wherein FIG. 1 is a longitudinal section of a linear segment of one embodiment of the endless belt provided by the invention; and FIG. 2 is a longitudinal section of a linear segment of a second embodiment of the endless belt provided by the invention.

The foregoing objects and others are accomplished in accordance with this invention, generally speaking, by providing an endless belt having an elastomeric body closed in the form of a ring and having longitudinally spaced teeth on one side thereof for meshing with teeth of a pulley to transmit motion, a tension resistant insert member embedded in the body comprising a plurality of flexible and inextensible cords which extend longitudinally through the belt, substantially parallel and substantially coplanar to each other, the belt being characterized by the fact that a fabric is disposed along an undulated longitudinally extending path through the belt body between the tension resistant insert member and the side of the annular belt body (back) which is opposite to the side having teeth. The composition of the elastomer of the belt body on one side of the fabric is different from that on the opposite side of the fabric. In other words, the alastomer forming the teeth and that portion of the belt body between the teeth and the undulated surface of the fabric is harder than the elastomer forming the belt body between the undulated fabric and the back or that side opposite from the teeth of the belt body. By providing the undulated fabric insert member between the hard and soft elastomers, the behavior of the belt as the belt flexes when the teeth mesh with the teeth of a pulley is improved without separation of the two elastomers, and with splitting and tearing of the belt that are significantly reduced.

In its more general aspects, a toothed belt according to the present invention has a belt body closed in the form of a ring, a plurality of flexible cords embedded in the body forming a tension resistant structure of the belt, the tension resistant structure dividing the belt body into two parts. A toothing is disposed on one face of the belt body. The portion of the belt body that is disposed on that side of the tension resistant structure opposite from that face provided with toothing, is divided in two parts by an undulated surface, preferably joined by a fabric layer.

Moreover, the elastomeric material forming the body between the undulated surface (or the fabric layer) and the surface of the belt body opposite to the toothing, i.e the back of the belt, has a lesser hardness than that forming the remaining part of the toothed belt.

As shown in FIG. 1, the toothed belt has a belt body 1 provided with a toothing formed by spaced teeth 2 on one face of the body 1 separated by spaces 3.

Within the belt body 1, in proximity of the bottom of the spaces 3 and of the bases of the teeth 2 there is a plurality of flexible and inextensible cords which combine to form the tension resistant structure 4 of the toothed belt.

In particular, the flexible and inextensible cords of tension resistant structure 4 are glass fiber cords. The cords of tension resistent structure 4 may also be nylon, polyester or steel but fiberglass cords are preferred because such cords have both a high tensile strength and a practically nill elongation under load.

Moreover, in the belt body 1, in the portion between the assembly of the cords of member 4 and the back 5 of the belt, a fabric layer 6 is embedded.

The fabric layer 6, which preferably is a weft and warp fabric layer, is an undulated layer where the pitch of the undulations is equal to the pitch of the toothing and where the top of the undulation which is directed toward the assembly of the insert member 4 is tangent to the cords thereof in correspondence of the midline 7 of each tooth.

The toothed belt of FIG. 1 is a belt of elastomeric material where the elastomeric material 8 between the fabric layer 6 and the back 5 of the belt has a different hardness property from the elastomeric material 9 forming the remaining part of the toothed belt. More particularly, the elastomeric material 8 has a hardness between 50 and 70 Shore A, while the elastomeric material 9 has a hardness between 70 and 90 Shore A; consequently, the elastomeric material 8 is softer and more flexible than that indicated with reference numeral 9.

By way of example, a compound suitable for forming the elastomeric material indicated with reference numeral 8 in FIG. 1 and a compound suitable for forming the elastomeric material indicated with reference numeral 9 in FIG. 1 have the following compositions:

The elastomer indicated with reference numeral 8 has the formula:
Polychloroprene polymer: 100 parts by weight
zinc oxide: 5 parts by weight
magnesium oxide: 4 parts by weight
stearic acid: 1 part by weight
waxes: 1 part by weight
dioctylate diphenylamine: 2 parts by weight
aromatic mineral oil: 5 parts by weight
carbon black: 30 parts by weight
hardness: 57 Shore A A compound particularly suitable for the formation of the elastomeric material indicated with reference numeral 9 has the formula:
Polychloroprene polymer: 100 parts by weight
zinc oxide: 5 parts by weight
magnesium oxide: 4 parts by weight
stearic acid: 1 part by weight
waxes: 1 part by weight
dioctylate diphenylamine: 2 parts by weight
aromatic mineral oil: 5 parts by weight
carbon black: 70 parts by weight
hardness: 80 Shore A An alternate embodiment of a toothed belt according to the present invention is shown in FIG. 2 where a linear segment of a covered toothed belt is represented in longitudinal section.

As shown in FIG. 2, the segment of the represented belt differs from that shown in FIG. 1 by the presence of a continuous fabric covering 10 over the toothing; i.e. by the presence of a continuous covering 10 for the outer surface of teeth 2 and the surfaces about spaces 3.

The covering described in U.S. Pat. No. 3,937,094 is particularly suitable for covering 10 for the toothing; i.e. as a covering formed by two layers of rubberized fabric doubled together with the interposition of a layer of elastomeric material.

Moreover, the two fabric layers are preferably doubled together with the interposition of a layer of elastomeric material with the outermost one being made of the fabric described in U.S. Pat. No. 3,621,727 of the same assignee.

By means of a toothed belt according to the present invention it is possible to achieve the desired purposes and an explanation of the achievement of the aimed purposes is the following.

The presence of soft elastomeric material in correspondence of the back of the belt body where the belt is subjected to bending stresses during operation in a transmission assembly with toothed pulleys, increases the flexibility of the belt. This increase of flexibility reduces the possibility that vibrations take place during the operation of the belt with the teeth of the belt engaging the teeth of toothed pulleys.

Moreover, the undulated configuration of the separating surface between soft elastomeric material and hard elastomeric material forming the belt, which involves a greater quantity of soft elastomeric material in correspondence of the belt teeth and a greater quantity of hard elastomeric material in correspondence of the belt spaces, provides a great increase in uniformity of flexibility of the toothed belt in its whole which prevents vibrations from arising during the operation of the toothed belt in transmission of motion with toothed pulleys.

Because of the particular undulated configuration of the surface which separates the soft elastomeric material from the hard elastomeric material, in correspondence of the spaces of the toothing, the thickness of hard elastomer in the belt body increases with increase of distance from the base of the teeth. This provides uniformity of the deformability of the belt body of each perpendicular section of the belt in correspondence of the toothing spaces. The result is that the bending radius of the belt in correspondence of the teeth spaces is substantially constant reducing the risk of small localized bending radii from establishing especially in correspondence of the midlines of the spaces, the small bending radii being very dangerous for the safety of the tension resistant insert member especially if it is formed by cords of glass fibers which are very brittle to bending stresses.

Another advantage of the undulated configuration of the separating surface between hard elastomeric material and soft elastomeric material in the belt body is the realization, because of its shape, of a dampening barrier for the vibrations which cannot take place in the longitudinal direction of the belt.

Moreover the presence of one fabric layer in the belt body which acts as a separating element and a connecting element between the two elastomeric materials having a different hardness results in (a) the presence of the fabric layer which delimits and surrounds the layer of hard elastomeric material in the toothed belt body in correspondence of the toothing spaces guarantees a uniform distribution of the stresses in the body of the belt and therefore a longer lifetime;

(b) with the same flexibility, with the known toothed belts it is possible to use for the formation of the teeth of the belts, compounds of substantially harder elastomeric material improving in this way the behavior of the toothed belts during engagement of the teeth of the belt with the teeth of the toothed pulleys and avoids because of the presence of the fabric, which constitutes the connecting element, possible separations between the different layers of elastomeric material forming the belt body;

(c) protection of the resistant insert of the belt from the action of foreign bodies or substances is obtained with the presence of the fabric in the belt body (and with the presence of the covering on the teeth).

Any suitable fabric which is resistent to tear can be used advantageously for fabric insert 6.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A toothed belt comprising an annular body of elastomeric material closed in the form of a ring, a tension-resistant insert member comprising a plurality of flexible and inextensible cords, parallel to and coplanar with one another and embedded in said annular body, said body having a first face for contacting a pulley and an opposite face, a toothing on said first face of the said body, and in that part of said body between said tension-resistant insert member and said opposite face an undulated surface dividing the elastomeric material of the annular body into two parts, the elastomer between the undulated surface and said first face being harder than the elastomer on the opposite side of the undulated surface.

2. The toothed belt of claim 1 wherein a fabric layer forms said undulated surface.

3. The toothed belt of claim 1 or 2 wherein the pitch of the undulations of the undulated surface is equal to the pitch of the belt toothing.

4. The toothed belt of claim 1 or 2 wherein the tops of the undulations directed toward the toothing are tangent to the plurality of said cords.

5. The toothed belt of claim 1 or 2 wherein the said cords are glass fiber.

6. The toothed belt of claim 1 or 2 wherein the elastomeric material forming the teeth and that part of the belt body between the said undulated surface and the toothing has a hardness of 70 to 90 Shore A, while the elastomeric material forming the remaining part of the body of the belt has a hardness of 50 to 70 Shore A.

7. The toothed belt of claim 1 or 2 wherein the surface of the toothing is coated with a covering.

8. An endless belt for motion transmission in association with a pulley comprising an annular elongated elastomeric body member having a first face for contacting a pulley and an opposite face, a series of spaced teeth integral with said first face for meshing with teeth of said pulley to transmit motion from one to the other, a tension resistant member embedded in the body member between said faces comprising a plurality of substantially inextensive flexible cords disposed substantially parallel and coplanar to each other, said elastomeric body having an undulating interface between first and second elastomers, the said first elastomer being disposed on that side of the undulating interface which includes said teeth and the second elastomer being disposed on the opposite side of the undulated interface and having a Shore A hardness less than and a greater flexibility than those of the first elastomer.

9. The endless belt of claim 8 having a fabric separating the two elastomers at the interface.

10. The endless belt of claim 8 or 9 wherein the peaks of the said undulations which face the toothead face are oriented towards the teeth and the peaks of the undulations which face said opposite face are oriented opposite spaces between the teeth thereby providing the thickest layer of the softer elastomer in correspondence with the teeth and the thickest layer of harder elastomer in correspondence with the spaces whereby an improved uniformity of bending characteristics along the length of the belt is obtained.

11. A toothed belt comprising an annular body of elastomeric material closed in the form of a ring, a tension-resistant insert member comprising a plurality of flexible cords, having practically nil elongation under load, parallel to and coplanar with one another embedded in said annular body, said body having a first face with spaced teeth for meshing with teeth of a pulley to transmit motion and an opposite face, and in that part of said body between said tension-resistant insert member and said opposite face an undulated fabric delimiting the elastomeric material of the annular body into two parts, the elastomer between the undulated surface and said first face being softer than the elastomer on the opposite side of the undulating surface, said fabric constituting the connecting element which avoids possible separations between the different layers of elastomeric material forming the annular belt body.

* * * * *